Oct. 13, 1964    W. H. SHERIFF    3,152,577
ANIMAL RESTRAINING DEVICE
Filed Jan. 30, 1963    2 Sheets-Sheet 1

William H. Sheriff
INVENTOR.

BY
*Clarence A. O'Brion*
*and Harvey B. Jackson*
Attorneys

Oct. 13, 1964  W. H. SHERIFF  3,152,577
ANIMAL RESTRAINING DEVICE
Filed Jan. 30, 1963  2 Sheets-Sheet 2
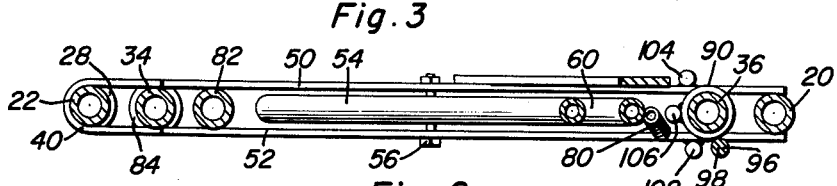
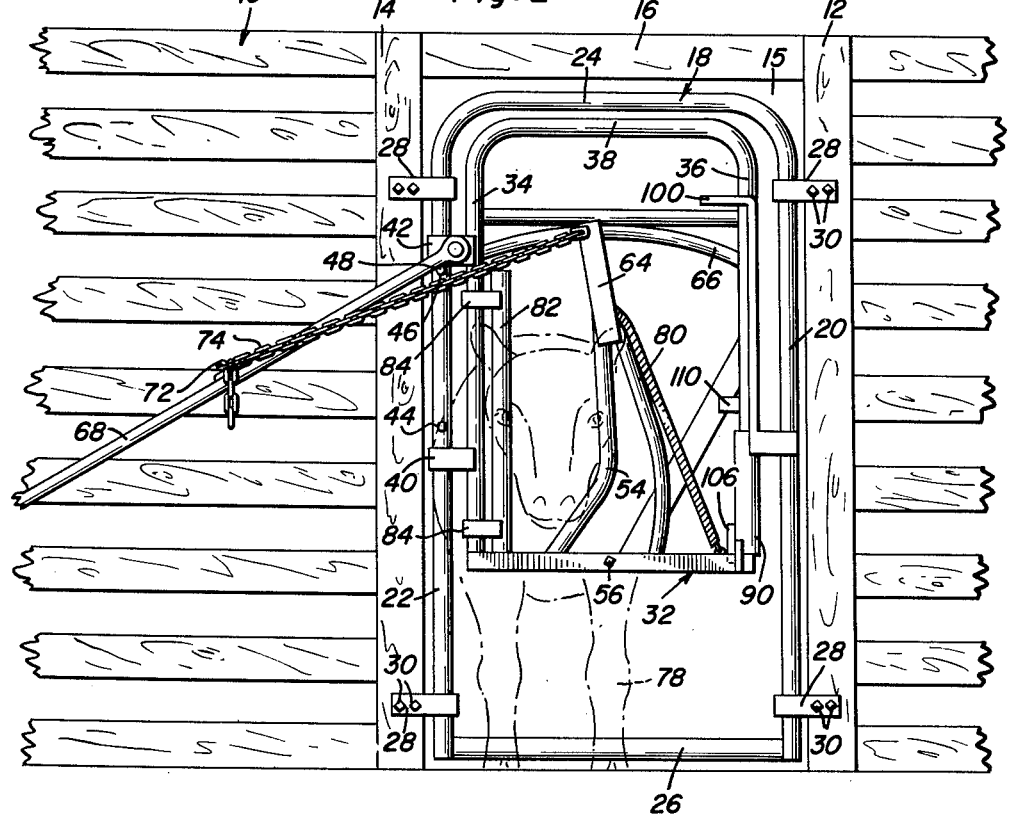
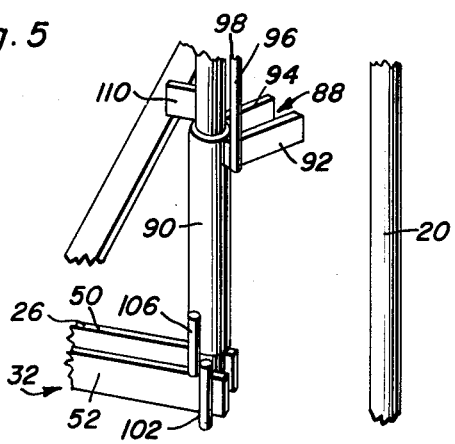
William H. Sheriff
INVENTOR.

3,152,577
ANIMAL RESTRAINING DEVICE
William H. Sheriff, R.F.D., Goodell, Iowa
Filed Jan. 30, 1963, Ser. No. 254,974
7 Claims. (Cl. 119—99)

This invention relates to an animal restraining device and more specifically to a swingably mounted gate-type member provided with means whereby large or small animals may be embraced about their neck in order that they may be held stationary while one or more operations on the animals are carried out.

This invention comprises an improvement over my prior U.S. Patent No. 3,043,268, and provides a means whereby the apparatus by which the neck of an animal may be embraced in order to hold the animal stationary may be adjusted so as to compensate for large and small animals.

There are many operations which are performed on animals from time-to-time such as taking blood samples, ringing animals and just inspecting the animals. The animal restraining device of the instant invention comprises a swingable gate-like member including a first upstanding abutment member along one upstanding edge portion of the gate member and a second upstanding abutment member is provided with at least a portion thereof movable toward and away from the first abutment member whereby the neck of an an imal may be clampingly engaged between the two upstanding abutment members.

Actuating means is provided for urging the second upstanding abutment member toward the stationary abutment member and the actuating means is provided with an over-center position for releasably retaining the second abutment member in its operative position. In addition, the first abutment member is provided with secondary upstanding abutment means which is movable between a retracted position and an operative position disposed between the first and second abutment members whereby a smaller space in which to clamp the neck of an animal will be defined between the second abutment member when it is in its operative position and the secondary abutment member when it is swung to its operative position than would be defined between the second abutment member and the first abutment member.

While the shiftable second abutment member may be utilized to enable the animal restraining device to compensate for animals having different size necks, the animals having larger necks are usually taller than animals provided with smaller necks and accordingly the animal restraining device of the instant invention includes means for swingably mounting the gate-like member in a manner whereby it may also be adjusted vertically along its upstanding axis of rotation in order to compensate for animals whose necks are at different heights from the ground.

The main object of this invention is to provide an animal restraining device which may be utilized effectively to hold animals stationary while various procedures are carried out on the animals.

Another object of this invention is to provide an animal restraining device in accordance with the preceding object including means by which the neck of the animal to be held stationary may be clampingly engaged between two upstanding abutment members.

Still another object of this invention is to provide an animal restraining device in accordance with the immediately preceding object including means by which the restraining device may be readily adjusted to compensate for animals having necks of different thicknesses.

Another object of this invention, in accordance with the two preceding objects is to provide an animal restraining device mounted upon a swingable gate-type member with the gate member being pivotally supported for rotation about an upstanding axis in a manner whereby the gate-type member may be adjusted vertically along its axis of rotation in order to compensate for animals whose necks are different distances from the ground.

A final object of this invention to be specifically enumerated herein is to provide an animal restraining device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the animal restraining device shown secured in an opening formed in a fence construction and with the animal restraining device being utilized to retain the neck of an animal in position between a pair of upstanding abutment members of the restraining device;

FIGURE 3 is an enlarged horizontal sectional view taken substantially upon the plane indicated by the section line 3—3 of FIGURE 1;

FIGURE 5 is a fragmentary enlarged perspective view of the free edge portion of the gate-type member showing the manner in which it may be latched in the closed position.

Figure 1:
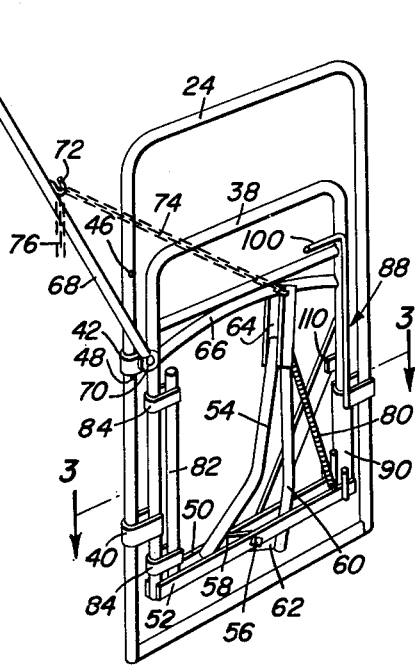
FIGURE 1 is a perspective view of the animal restraining device.

Referring now more specifically to the drawings the numeral 10 generally designates a fence construction including a pair of adjacent uprights 12 and 14 interconnected at their upper ends by means of a cross brace 16 and defining an opening 15 therebetween. The animal restraining device of the instant invention is generally designated by the reference numeral 18 and includes a generally rectangular upstanding framework including a pair of side members 20 and 22 which are interconnected at their upper and lower ends by means of horizontal members 24 and 26. The framework is secured in the opening 15 by means of suitable mounts 28 that are secured to the upper and lower ends of the side members 20 and 22 and to the uprights 12 and 14. It may be seen that the mounts 28 are secured to the uprights 12 and 14 in any convenient manner such as by fasteners 30.

A gate generally designated by the reference numeral 32 and including a pair of uprights 34 and 36 interconnected at their upper ends by means of a cross brace 38 is provided and a pair of generally U-shaped members 40 and 42 are secured to the upright 34 and rotatably and slidably receive the side member 22. It may best be seen from FIGURES 2 and 4 of the drawings that the side member 22 is provided with a pair of vertically spaced bores 44 and 46 that may be utilized to secure the gate 32 in adjusted vertical positions by means of the fastener 48 which may be secured in a selected one of the bores 44 and 46 to support the uppermost U-shaped member 42 from beneath and maintain the gate 32 in adjusted elevated position.

With attention now invited to FIGURES 1 and 5 of the drawings it may be seen that the lower ends of the uprights 34 and 36 are interconnected by means of a pair of generally parallel brace members 50 and 52. The upright 34 comprises a first upstanding abutment member and it may be seen from FIGURES 1, 2 and 4 of the drawings that a second upstanding abutment member 54 is provided and is swingably supported from the pivot pin 56 by means of a lower right angled arm portion 58. The second upstanding abutment member 54 also includes an upstanding portion 60 which is secured to the pivot pin 56 by means of an arm portion 62 and which is secured at its upper end to the upper end of the second upstanding abutment member 54. A guide 64 is secured in any convenient manner to the upper ends of the members 54 and 60 and slidably engages an arcuate guide 66 which is secured between the uprights 34 and 36 of the gate 32. A lever arm 68 is pivotally secured to the upright 34 by means of a pivot pin 70 and a hook 72 is secured to its mid-portion. A flexible pull chain 74 has one end secured to the guide 64 and may have a selected one of its links 76 engaged with the hook 72 on the lever 68. From a comparison of FIGURES 1 and 2 of the drawings it may be seen that by swinging the lever 68 in a counterclockwise direction from the position illustrated in FIGURE 1 of the drawings that the second upstanding abutment member 54 may be moved toward the first upstanding abutment member defined by the upright 34. In this manner, the neck of the cow 78 may be gripped between the abutment members 34 and 54. As can best be seen from FIGURES 2 and 4 of the drawings, the lever or lever arm 68 includes an over-center position for retaining the second abutment member 54 in the positions illustrated in FIGURES 2 and 4 of the drawings.

An expansion spring 80 is secured between the guide 64 and the lower end of the free swinging edge of the gate 32 and yieldingly urges the abutment member 54 toward the inoperative position illustrated in FIGURE 1 of the drawings.

Figure 4:
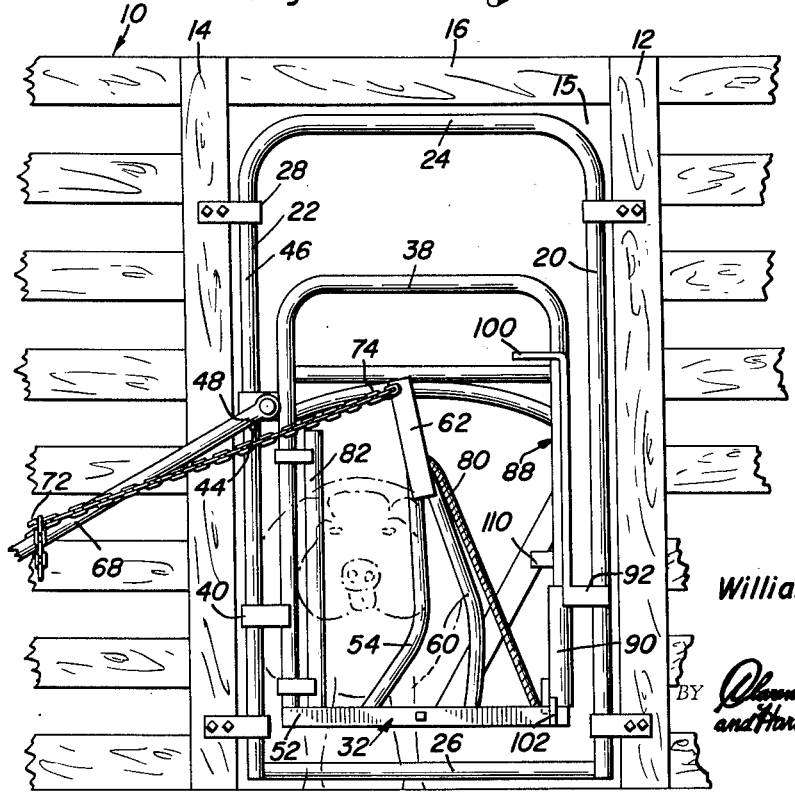
FIGURE 4 is a side elevational view similar to that of FIGURE 2 but showing the swingable gate-type member of the restraining device in a lowered position.

In addition to the first abutment member defined by the upright 34, a secondary upstanding abutment member 82 is provided and includes a pair of U-shaped arm members 84 by which the secondary abutment member 82 is pivotally and slidably mounted on the abutment member 34 between an inoperative position pivoted out of the area between the abutment members 54 and 34 and the operative positions illustrated in FIGURES 1, 2 and 4.

With attention now invited to FIGURES 1, 3 and 5 of the drawings, it may be seen that a latch assembly generally referred to by the reference numeral 88 is provided and that it includes a sleeve 90 which is slidably and rotatably received on the upright 36. A pair of arms 92 and 94 are secured to the upper end of the sleeve 90 and a pull crank 96 having a shank portion 98 is also provided. The shank portion 98 has its lower end secured to the arm 92 and it terminates at its upper end in a laterally directed handle 100. A pair of stop pins 102 and 104 are provided and secured to the members 52 and 50 in any convenient manner such as by welding. An abutment pin 106 is secured to the lower end of the sleeve 90 and is engageable with the upper portions of the pins 102 and 104. The latch assembly 88 receives the side member 20 between the free ends of the arms 92 and 94 as the gate 32 is swung to the closed position as viewed in FIGURE 5 of the drawings. After the side member 20 is received between the free ends of the arms 92 and 94, continued movement of the gate 32 to the closed position illustrated in FIGURE 2 of the drawings will cause the sleeve 90 to rotate in a clockwise direction as viewed from the top in order to align the pin 106 with the area defined between the members 50 and 52. The lower end of the pin 106 abuts the upper surface of the member 52 until it is free to drop in the area between the members 50 and 52. Then, the lower end of the sleeve 90 rests upon the upper ends of the pins 102 and 104. The members 50 and 52 prevent rotational movement of the sleeve 90 sufficient to enable the gate 32 to be opened and therefore the gate 32 is locked in the closed position illustrated in FIGURES 1, 2 and 4 of the drawings until such time as the shank portion 98 is lifted by means of the handle 100 and rotated to the position illustrated in FIGURE 5 of the drawings or the opposite limit position with the pin 106 abutting the pin 104. Then, the gate 32 may be swung to the open position.

An abutment 110 is provided and is engageable by the upper end of the sleeve 90 to limit upward movement of the latter during actuation of the latch assembly 88 to the unlatched position.

Inasmuch as the amount the second upstanding abutment member 54 may be swung about the axis of rotation defined by the pivot pin 56 by the adjustment of the chain 74 on the hook 72, and the secondary abutment member 82 may be swung into and out of an operative position, it may be readily seen that the animal restraining device may be adjusted so as to readily compensate for animals having necks of different thicknesses. Additionally, the gate 32 may be adjusted vertically in the framework by means of the pin 48 and may therefore be readily adapted to conform to operation in connection with animals whose necks are different heights from the ground.

This very important feature is especially useful in the Midwestern States where cattle and hogs are raised in the same area. Heretofore separate hog gates and cattle gates have been used thus requiring twice the number of gates which would be demanded if the vertically adjustable gate of the instant invention were used since this improved gate is capable of handling both cattle and hogs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a pair of uprights defining an opening therebetween, an animal restraining gate including first upstanding abutment means at one upstanding edge portion, means pivotally securing said one upstanding edge portion to one of said uprights for swinging movement about an upstanding axis between an open position and a closed position extending between said uprights with the free edge portion of said gate adjacent the other of said uprights, second upstanding abutment means supported from said gate for movement of at least a portion thereof toward and away from said first abutment means for embracing the neck of an animal disposed between said abutment means, said one edge portion of said gate also including an elongated upstanding member defining secondary abutment means for coaction with said second abutment means, a pair of generally parallel arm means secured at corresponding ends to said upstanding member and projecting outwardly therefrom at points spaced longitudinally therealong and pivotally and slidably secured at the other pair of corresponding ends thereof to said first upstanding abutment means for swinging movement of said upstanding member between an operative extended position disposed between said first and second abutment means and a retracted out-of-the-way position swung to one side of the medial plane of said gate, said gate including an upstanding side member extending along its free edge portion and a pair of generally parallel horizontal members extending between the lower ends of said first upstanding abutment means and said upstanding side member, the lower end of said upstanding member including a portion receivable between said horizontal members when said upstanding member is in the operative position, said upstanding member being longitudinally shiftable relative to said first abutment means to withdraw said lower end portion from between said horizontal members prior to swinging movement of said secondary abutment means from said operative position toward said inoperative position.

2. The combination of claim 1 wherein said means pivotally securing said gate to said one upright also includes means slidably engaging said one upright enabling vertical adjustment of said gate on said one upright, means coacting with said one upright and the last mentioned means releasably retaining said gate in vertically adjusted positions relative to said one upright.

3. The combination of claim 1 including means yieldingly urging said second upstanding abutment means away from said first upstanding abutment means.

4. The combination of claim 3 including lever actuator means connected between said second upstanding abutment means and said one upright and operable to urge said second abutment means toward said first abutment means.

5. The combination of claim 4 wherein said lever actuator means includes an over-center limit position releasably latching said second abutment means in an operative position adjacent said first abutment means.

6. The combination of claim 5 wherein said lever actuator means includes adjustable means by which the spacing between said one abutment means and said portion of said second abutment means, when said actuator means is in said over-center position, may be adjusted.

7. The combination of claim 1 wherein said second upstanding abutment means comprising an upstanding arm member pivotally secured at its lower end between said parallel members intermediate their opposite ends for rotation about a generally horizontal axis extending transversely of said parallel members and swinging movement of the upper end portion of said upstanding arm member toward and away from the upper end portion of said first upstanding abutment means.

References Cited in the file of this patent
UNITED STATES PATENTS

| | | |
|---|---|---|
| 1,132,438 | Carr | Mar. 16, 1915 |
| 2,099,956 | Flatley | Nov. 23, 1937 |
| 2,214,969 | McNett | Sept. 17, 1940 |
| 2,508,549 | Stephenson | May 23, 1950 |
| 2,585,152 | Merchant | Feb. 12, 1952 |
| 2,773,476 | Thomas | Dec. 11, 1956 |
| 3,043,268 | Sheriff | July 10, 1962 |